March 13, 1956 J. W. GRAY 2,738,504

DIGITAL NUMBER CONVERTER

Filed Aug. 18, 1951

INVENTOR.
JOHN W. GRAY

BY H. L. Mackey
ATTORNEY 2,738,504
Patented Mar. 13, 1956

2,738,504

DIGITAL NUMBER CONVERTER

John W. Gray, White Plains, N. Y., assignor to General Precision Laboratory Incorporated, a corporation of New York Application August 18, 1951, Serial No. 242,560

10 Claims. (Cl. 340—347)

This invention pertains to a digital number converter, and more specifically to a device for accepting a magnitude in terms of the several digits of a digital number representation, and presenting it as the magnitude of a single physical quantity representing the number in analogue fashion.

An abstract quantity or magnitude can be represented in any one of a large number of ways, of which the familiar decimal system of numbers is merely one. In this system a series of ten symbols called digits are arranged side by side in positions called digit positions having values, the positions increasing in value each by a factor of ten from right to left. In another, the binary system, there is a series of two symbols (also called digits), those usually selected being zero and one, and these symbols are arranged in positions increasing in value by a factor of two from each position to the next to the left.

As an example, seven binary symbols may be arranged to form a binary number: 1011011. It is convenient to translate such a number into the decimal system to facilitate understanding of its magnitude. This may be done as follows: The first digit at the right is one and has a value of one. The next is one and has a value of two. The next, being zero, has zero value. The fourth, being one, has a value of eight, etc. The total is the sum of all values, and expressed decimally it is $$64+0+16+8+0+2+1$$

which equals 91. If all binary digits were one, the sum would be 127, and if all were zero, the sum would be zero.

The binary system of numbers is widely used in digital computers, but as the above example indicates, the translation from binary representation to decimal representation, in which quantities are ordinarily expressed and thought of, is an unwieldy mathematical operation. There has therefore existed a great need for means of representing a binary number in a visual manner or to a decimal scale. Such a representation would constitute an automatic means of translating from the binary to the decimal system, and would eliminate all necessity for the laborious mathematical operation described above, within limits of visual accuracy.

The instant invention does this and much more, for it translates a quantity presented to it in binary terms to a single physical magnitude. The physical magnitude can then be presented either as a visual display or as an electrical or mechanical quantity which can be used in another device. In the former case the visual display can be on a scale calibrated in any system, the device translating from the binary to the decimal system if the scale is a decimal one. If the presentation is as a quantity that can be used in another device the quantity has a magnitude which is the analogue of the input binary representation of a number, and the utilizing device can be an analogue computer. The instant invention thus becomes a translatory device for presenting binary data to an analogue computer. The invention also can be used to multiply binary numbers by a voltage which may vary even to the extent of becoming negative.

The digital number converter consists essentially of a number of similar electrical units, there being as many units as there are digit positions in the binary input data. These units cooperate to form an electrical quantity sum of the individual electrical quantity output of each unit, and the resulting electrical sum is employed either directly in displaying an electrical indication representing the output quantity, or in operating a servomechanism. The shaft or other mechanical component of the servomechanism then has a movement representing the magnitude of the output quantity, the quality of the movement utilized being either its displacement, speed, acceleration or other mechanical property.

The electrical quantity sum can be formed in two ways, giving rise to two embodiments of the invention. In one arrangement electrical currents are added to form a total current; in the other arrangement electrical voltages are added to form a total voltage.

There are many ways of representing a quantity digitally in addition to the straightforward binary method mentioned above, but all are based upon that method. For instance, there is a binary-coded decimal system, in which each digit of a decimal number is represented by a separate binary number. There is also a quinary-coded decimal system, in which each digit of a decimal is represented by a sum of none, one, or two of a separate series of five symbols. In each case two-position switches or other two-position elements are employed in the representation. The instant invention is applicable to all of these systems by application of the common principle of employing a set of impedors or voltage sources having admittances or voltages respectively in a specific series of ratios, so that in the one case net currents are added and in the other case net voltages are added. In each case the instant invention employs two-position switches or other two-state devices, receives data in terms of numerical representations separated into binary digital places and presents output data in analogue form.

The purpose then of this invention is to provide means for translating input data in binary digital form to data in linear physical form.

More specifically, a purpose of this invention is to provide means for translating binary digital input data into analogue form having a magnitude proportional to the magnitude of the value of the input data.

An additional purpose of the invention is to provide means for translating binary digital input data into a physical displacement or speed linearly proportional to the value thereof.

Another purpose of this invention is to provide means for representing the digits of a binary or quasi-binary number by electrical currents, and for adding these currents together to produce a summation current representing by its magnitude the value of the input number.

Still another purpose of this invention is to provide means for representing the digits of a binary or quasi-binary number by electrical voltages, and for adding these voltages together to produce a summation voltage representing by its magnitude the value of the input number representation.

A further understanding of the invention can be secured from the detailed description and the accompanying drawings, in which.

Figures 1, 2, 3, 4, 5:
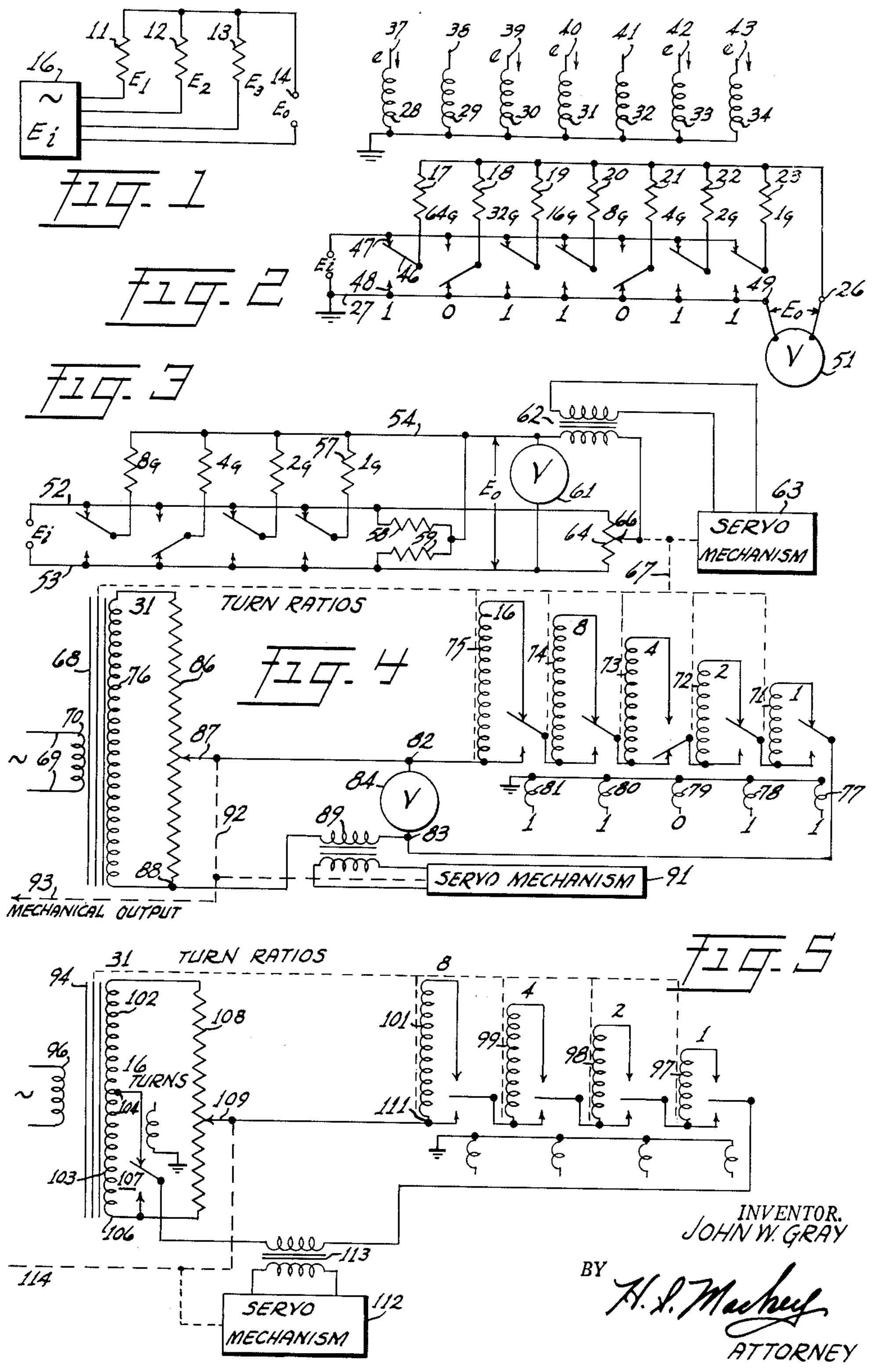
Figure 1 represents a circuit embodying a principle of the invention.
Figures 2 and 3 depict circuits embodying one form of the invention.
Figures 4 and 5 depict circuits embodying another form of the invention.

The embodiment of the invention which adds electrical currents depends for its operation on the principle that in a group of resistors connected in star the output voltage equals the sum of the conductance multiplied by the voltage of each branch, divided by the sum of the conductances. This is illustrated in Fig. 1, in which a group of three resistors, 11, 12 and 13, are connected in star to a common terminal 14, and each is connected at the other end to a voltage source 16, either alternating or direct, in such manner that various potentials $E_1$, $E_2$ and $E_3$ are applied. If the conductances are $G_1$, $G_2$ and $G_3$, the output potential $E_0$ is:

$$E_0=\frac{E_1G_1+E_2G_2+E_3G_3}{G_1+G_2+G_3} \qquad (1)$$

This rule applies to any number of branches.

A practical circuit is illustrated in Fig. 2, in which seven resistors 17–23 are connected to a common terminal 26. A two-position switch is connected to each resistor so that it can be connected either to a secure of potential, $E_i$, either alternating or direct, or to a zero-potential bus bar 27. The switches constitute armatures and contacts of relays, the seven windings of which, 28–34, are energized from seven separate circuits, 37–43. These circuits represent binary digital input data means. Each circuit may be in either of two conditions, either excited by a voltage or unexcited. If excited, it represents one state or symbol of a binary digit, such as that represented by the number one, and if unexcited it represents the other state, symbolized by zero. When a circuit is excited, it energizes the connected relay winding, such as winding 28, for instance, and attracts its armature 46 to the contact 47. When the circuit is unexcited, the armature makes contact with the contact 48. In the excited case the potential $E_i$ is applied to the armature while in the unexcited case the zero potential is applied.

The resistors 17–23 are made to have conductances that constitute a power series, so that they double from position to position, increasing toward the left. They thus form a series having values proportional to the values of the digital positions in a binary number. That is to say, if the conductance of the resistor 23 be termed 1G, the conductances of the others then will be respectively 2G, 4G, 8G, 16G, 32G and 64G. Let it be assumed that the channels 37, 39, 40, 42 and 43 are excited, corresponding to the binary symbol one, while the remainder, 38 and 41, are unexcited, corresponding to the symbol zero. The seven channels then present to the device the binary number 1011011, which is written below the respective switches in Fig. 2. These several switches will then assume their corresponding up and down positions as shown.

The Equation 1 applied to this device then becomes:

$$E_0=\frac{E_i64G+0\times32G+E_i16G+E_i8G+0\times4G+E_i2G+E_iG}{64G+32G+16G+8G+4G+2G+1G} \qquad (2)$$

or $$E_0=\frac{E_i(64G+16G+8G+2G+G)}{127G} \qquad (3)$$

therefore $$E_0=\frac{91}{127}E_i \qquad (4)$$

That is, the output voltage $E_0$ as measured at the terminals 26 and 49 by a high-resistance voltmeter 51 is $^{91}/_{127}$ of the input voltage $E_i$. The proportion $^{91}/_{127}$ represents the proportion that the value of the numerator of Equation 2 bears to the maximum possible value of the numerator and is the same as the proportion that the value of the input binary number bears to the value of a 7-digit binary number composed of ones.

This representation holds true for each and every possible value of digital input data, so that the output voltage always constitutes an instant and accurate analogue representation of any binary input data. There is no limit to the magnitude of the input binary number and to the number of digit places it contains, there being in all cases one relay and one conductance provided for each digit place. The accuracy of the output representation depends upon the accuracy of regulation of the input voltage $E_i$, upon the accuracy of the resistors, principally the highest conductivity resistor, and upon the visual accuracy of reading the display.

It is of course obvious that, although pure resistances have been assumed, impedances of any type may be employed, with alternating voltage supplied as the $E_i$ input and with admittances substituted for conductances in the equations.

It will be obvious that the impedance presented by the device to the voltmeter 51 is completely independent of the positions of the switches, and is constant, whatever their several positions, assuming zero impedance for the input potential source, which is easily approached in practice. The impedance of the utilizing device, such as the voltmeter 51, must be constant but need not be high to preserve the linearity of output. However, if the impedance is not infinite it enters as a scale factor in the calculation of $E_0$.

In Fig. 3 two resistors, 58 and 59, placed in series across the input voltage $E_i$, serve as convenient means for adjusting the maximum voltage, minimum voltage, and slope of the output voltage as measured at a voltmeter 61. The common point of the resistors is connected directly to the output bus 54. The resistor 58 may be treated as if it were a resistor in the series of other resistors, 8G to G, connected to the bus bar 52 by relay contacts. Likewise the resistor 59 may be treated as if it were a resistor in the series and connected to the zero bus 53 by relay contacts. Consequently the equation of the form of (1) describing the output voltage of this network is:

$$E_0=\frac{E_i(8G+2G+G+G_{58})}{8G+4G+2G+G+G_{58}+G_{59}} \qquad (5)$$

$$=\frac{11G+G_{58}}{15G+G_{58}+G_{59}}E_i \qquad (6)$$

Inspection of this equation shows that the conductance $G_{58}$ of resistor 58 mainly controls the minimum value of $E_0$, which occurs when all switches are placed down, and the conductance $G_{59}$ largely controls the maximum value of $E_0$, with all switches up. Both resistors affect the scale calibration or slope of the output characteristic.

In place of an output voltage indication, a mechanical output may be employed to indicate output data or to supply output data to following equipment such as an analogue computer or any other utilizing equipment. To accomplish this purpose, it is convenient to employ a servomechanism of any type, the two usual types being position and rate servos. If, for example, a position servo be employed and the voltage supply $E_i$ is alternating, a transformer 62 having one end of its primary connected to the conductor 54 and the other end connected to a movable contact 66 on the voltage divider 64 constitutes the error voltage input for the servomechanism 63. Operation of the servomechanism by the error voltage moves the arm 66 of the voltage divider 64 in such a direction as to bring the current in the transformer 62 to zero. In so doing the mechanism displaces the shaft 67 by an angle representing the output data.

To summarize, the described equipment sets up electrical conductances in accordance with an input number represented in binary digits, and measures the aggregate current passed by the conductances, which is proportional to the aggregate conductance. This is more clearly shown by rewriting Equation 2 for application to a 5-digit binary number 11011:

$$E_0=\frac{E_i(1\times16G+1\times8G+0\times4G+1\times2G+1\times G)1}{31G} \qquad (7)$$

Each of the five conductances in the numerator is multiplied by a number representing one of the two digits, 1 or 0, in each place of the binary number 11011. Since the conductance G appears in each term, all G's cancel, resulting in a pure ratio. Since the conductances cancel out, any other electrical quantity or property may be employed in place of conductance in an appropriate circuit for adding the individual magnitudes of electrical property.

Such a circuit is illustrated in Fig. 4, in which conductance is replaced by transformer turn ratios. The turn ratios are represented by voltages and are switched in accordance with a binary number representation, by which operation the turn ratios and voltages are added to represent analogously the binary number input value. Equation 7 can be rewritten to represent the operation of this embodiment as follows:

$$E_0=\frac{E_i(1\times 16T+1\times 8T+0\times 4T+1\times 2T+1\times T)}{31T} \qquad (8)$$

In this equation T stands for a selected number of turns in a transformer secondary winding, the turn ratio and the induced voltage output both being proportional to the number of turns. The form of Equation 8 is the same as that of Equation 7, which demonstrates that the embodiment of the invention employing the addition of voltages is analogous to the embodiment employing the addition of currents.

Referring now to Fig. 4, a transformer 68 is energized by alternating current of any convenient frequency connected through conductors 69 to the transformer primary winding 70. If servomechanism is to be employed the transformer is provided with a number of secondary windings that is one more than the number of digits in the binary number to be represented as input data. However, if servomechanism is not required and the output is to be indicated simply by a voltmeter, only the number of secondary windings equal to the number of digital places is needed. Let it be required to apply data representing a five-digit binary number. Then five of the secondary windings, 71–75, are designed to have turns in the ratio of the values of the digit places of the binary number, that is, in the ratio 1, 2, 4, 8 and 16. These numbers are marked above the windings respectively in Fig. 4. A sixth winding 76, has a turn ratio that equals the sum of all of the other turn ratios, or 31. Five single-pole double-throw relays have windings 77–81 arranged to receive electrical energization representative of the binary digits 1 or 0, exactly as described in connection with Fig. 2, and have their contacts so connected to respective transformer secondary windings that when a relay is energized to represent the digit 1, the secondary winding is connected into a series circuit, but when the relay is deenergized to represent the digit 0, the secondary winding is removed from the series circuit. Thus, in Fig. 4 the binary number 11011 is represented by four relays energized and one not energized, resulting in the series connection of the four windings 71, 72, 74 and 75. This sets up a circuit from the terminal 82 through the 16T turns of transformer secondary winding 75 and the 8T, 2T and 1T turns of 74, 72 and 71 to terminal 83, making a total of 27T turns and a proportional voltage. A voltmeter 84 is connected between terminals 82 and 83 upon which this proportional voltage is indicated. Any other binary number input will result in another voltage output exactly analogous to the value thereof.

A mechanical displacement or shaft speed proportional to the voltage output is secured by shunting the largest secondary winding 76 with a resistor 86 having a slider 87. The voltage output terminals 82 and 83 are connected between the slider 87 and one resistor terminal 88 in the subtractive sense, so that a null position of the slider 87 can be found for any position of the relays, at which no current will pass through the slider 87. A current transformer 89 is connected between terminals 83 and 88 to serve as a null indicator and error signal transmitter and constitutes the input to a servomechanism 91, the output of which is back-connected to the slider 87 through a shaft 92 in such sense as to move the slider to reduce the error signal toward zero. A shaft take-off 93 permits utilization of the output in the other equipment, such as an analogue input computer, the movement of this shaft 93 being the analogue representation of the value of the binary number input data.

Fig. 5 represents a slightly different circuit also having a 5-place binary number input and a sero shaft output. It is similar to Fig. 4, but has the virtue of requiring only five secondary windings instead of six. This is accomplished by making one winding do double duty.

In Fig. 5 a transformer 94 has a primary winding 96, and four secondary windings 97, 98, 99 and 101 which have turns in the ratios of 1, 2, 4 and 8 respectively. Associated with each secondary winding is a relay for connecting it into or out of a series circuit in accordance with a binary code input. Thus these secondary windings and relays are connected and function like the four smallest windings and associated relays of Fig. 4. The transformer 94 is also equipped with a secondary winding 102 having turns in the ratio of 31 to the turns of the other secondary windings. A portion 103 of this winding comprehended between a tap 104 and an end terminal 106 has a number of turns represented by the number 16 in ratio to the turns of the other windings. This portion 103 is associated with a relay 107 having such connections as effectively to connect this portion 103 in series with the series circuit of the windings 97, 98, 99 and 101 in one state, and to disconnect the portion 103 from this circuit in the other state. Thus the winding portion 103 in Fig. 5 plays the same part in the circuit as the winding 75 does in the circuit of Fig. 4. At the same time the entirety of the winding 102 has a voltage that can be employed to oppose that of the windings 97, 98, 99, 101 and 103, or any of them, in series. This voltage of the entire winding 102 is employed to energize a voltage divider 108 having a slider 109 connected to the terminal 111 of the winding 101 and moved mechanically by a servomechanism 112. The servomechanism 112 is energized by an error signal transformer 113 and controls the slider 109 so as to equate a fraction of the voltage of winding 102 to the voltage of the series computing circuit, and to move the slider to the null point. The slider motion in reaching the null point therefore represents the analogue output and is available at a takeoff shaft 114 for operation of following analogue input equipment.

It is obvious that in place of the mechanically, manually or electrically operated two-position switches described in the embodiments, any other devices that have two electrical states can be used with appropriate restrictions upon the relative impedances of the several circuit components. A thyratron tube is one example of such a device, such a tube having a conductive and nonconductive electrical state.

What is claimed is:

1. A digital number converter comprising, a plurality of impedance elements the admittance of each of which bears such relation to that of the remainder as to form a series of impedance elements the admittance of which increases in geometric progression, a plurality of switching means each having two conditions of operation each connected to a respective one of said impedance elements, a source of potential supply, an output circuit, circuit means for energizing a respective impedance element by said potential source and connecting said respective impedance element in series with said output circuit in one condition of operation of its connected switching means and for connecting said impedance element in parallel to said output circuit in the other condition of operation of said switching means, means for operating said switching means to one or the other of their conditions of operation in accordance with the symbols of the several digits of a binary number, and indicating means connected to said output circuit.

2. A digital number converter comprising, a plurality of resistance elements the conductivity of each of which bears such relation to that of the remainder as to form a series of resistance elements the conductivity of which increases in a geometric progression whose common ratio is two, a plurality of switching elements each having two conditions of operation each connected to a respective one of said resistance elements, a potential source, an output circuit, circuit means including said switching means for energizing a respective resistance element by said potential source and connecting said respective resistance element in series with said output circuit in one condition of operation of its connected switching means and for connecting said resistance element in parallel to said output circuit in the other condition of operation of said switching means, means for operating said switching means to one or the other of their conditions of operation in accordance with the symbols of the respective digits of a binary number, and indicating means connected to said output circuit.

3. A digital number converter comprising, a plurality of impedance elements the admittance of each of which bears such relation to that of the remainder as to form a series of impedance elements the admittance of which increases in geometric progression, an output circuit having one terminal in common with a respective terminal of each of said impedance elements, a plurality of switching elements each having two conditions of operation and each connected to a respective one of said impedance elements, a potential source, circuit means including said switching elements for energizing a respective impedance element by said potential source and connecting said respective impedance element in series with said output circuit in one condition of operation of the respective switch element connected thereto and for connecting said respective impedance element in parallel to said output circuit in the other condition of operation of said switching element, actuating means for each of said switch elements, each of said actuating means being operative by a signal representative of a digit of a binary number, and indicating means connected to said output circuit.

4. A digital number converter as set forth in claim 3 having a resistance connected across said potential source with an intermediate terminal thereof connected to the common terminal of said output circuit and said impedance elements.

5. A digital number converter comprising, a plurality of resistance elements the conductance of each of which bears such relation to that of the remainder as to form a series of resistance elements the conductivity of which increases in a geometric progression whose common ratio is two, an output circuit having one terminal in common with a respective terminal of each of said resistance elements, a plurality of switching elements each having two conditions of operation and each being connected to a respective one of said resistance elements, a potential source, circuit means including said switching elements for energizing a respective resistance element by said potential source and connecting said respective resistance element in series with said output circuit in one condition of operation of the respective switch element connected thereto and for connecting said respective resistance element in parallel to said output circuit on actuation of said connected switch element to its other condition of operation, actuating means for each of said switch elements, each of said actuating means being operative by a signal representative of a digit of a binary number, and indicating means connected to said output circuit.

6. A digital number converter as set forth in claim 5 having a resistance connected across said potential source with an intermediate terminal thereof connected to the common terminal of said output circuit and said resistance elements.

7. A digital number converter comprising, a plurality of impedance elements the admittances of which are related to each other in accordance with a geometric progression, a common terminal for said impedance elements, a plurality of relays each having an armature respectively connected to the remaining terminal of each of said impedance elements, each of said relays having a pair of contacts positioned for alternate engagement by a respective armature, said contacts being connected to opposite terminals of a potential supply, an output circuit connected between the common terminal of said impedance elements and one terminal of said potential supply, an actuating means for each of said relays each of which are operative to cause the armature of its associated relay to engage one or the other of its contacts in accordance with a selected symbol of a binary number digit, and indicating means connected to said output circuit.

8. A digital number converter as set forth in claim 7 having a resistance connected across said potential supply, with an intermediate terminal thereof connected to the common terminal of said impedance elements.

9. A digital number converter comprising, a plurality of resistance elements, the conductances of which are related to each other in accordance with a geometric progression having a common ratio of two, a terminal common to all of said resistance elements, a plurality of relays each having an armature respectively connected to the remaining terminal of respective ones of said resistance elements, each of said relays having a pair of contacts positioned for alternate engagement by a respective armature, said contacts being connected to opposite terminals of a potential supply, an output circuit connected between the common terminal of said resistance elements and one terminal of said potential supply, an actuating means for each of said relay armatures for causing the armature of the relay associated therewith to engage one or the other of the relay contacts in accordance with a selected symbol of a binary number digit, and indicating means connected to said output circuit.

10. A digital number converter as set forth in claim 9 having a resistance connected across said potential supply, and an intermediate terminal thereof connected to the common terminal of said resistance elements.

References Cited in the file of this patent

UNITED STATES PATENTS

| | | |
|---|---|---|
| 2,023,221 | Fischer et al. | Dec. 3, 1935 |
| 2,404,250 | Rajchman | July 16, 1946 |
| 2,503,765 | Rajchman et al. | Apr. 11, 1950 |
| 2,556,200 | Lesti | June 12, 1951 |
| 2,568,932 | Rajchman et al. | Sept. 25, 1951 |
| 2,584,897 | Marco | Feb. 5, 1952 |
| 2,630,552 | Johnson | Mar. 3, 1953 |
| 2,685,084 | Lippel et al. | July 27, 1954 |

FOREIGN PATENTS

| | | |
|---|---|---|
| 604,561 | Great Britain | July 14, 1948 |

OTHER REFERENCES

"Progress Report (2) on the ECVAC" by the Moore School of Engineering; University of Pa.; Declassified Feb. 13, 1947; pages 6:27–6:36A.